UNITED STATES PATENT OFFICE.

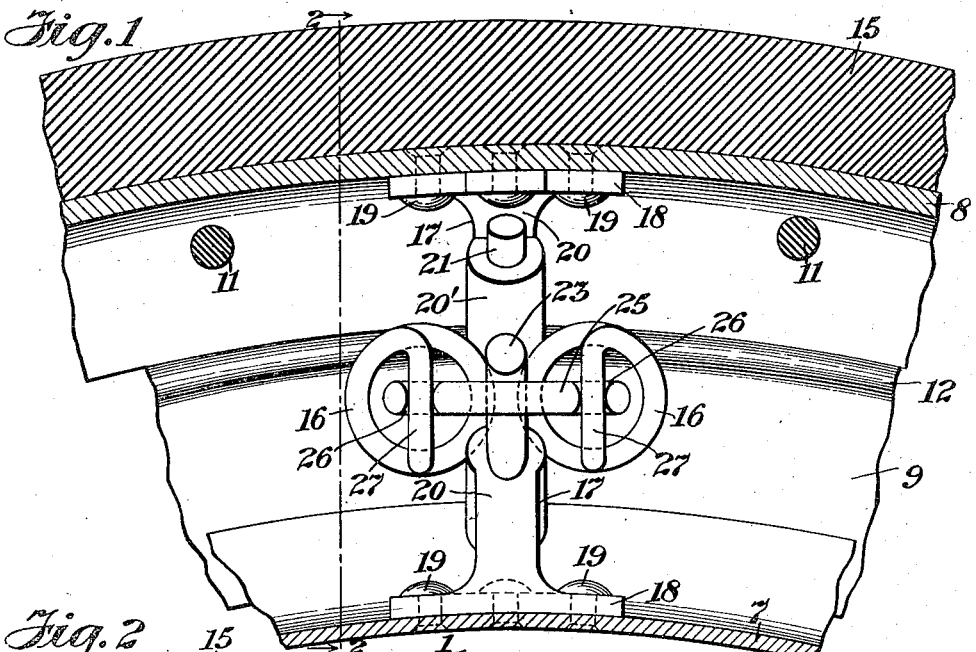
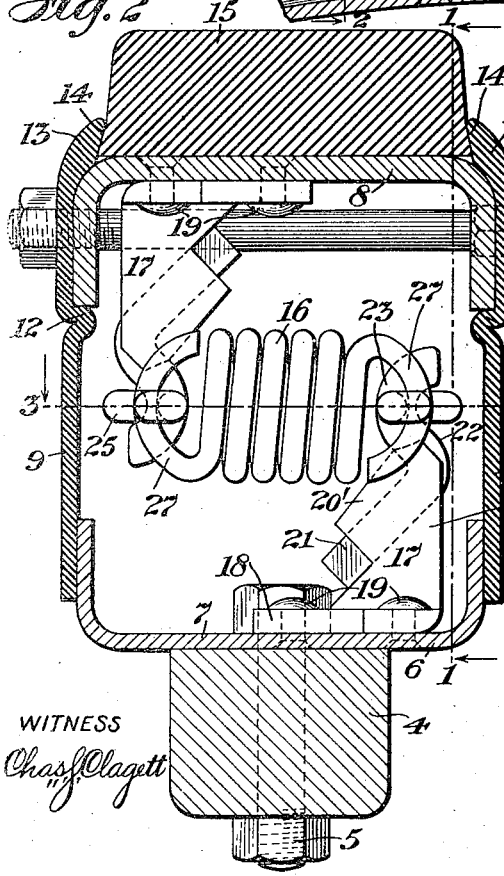
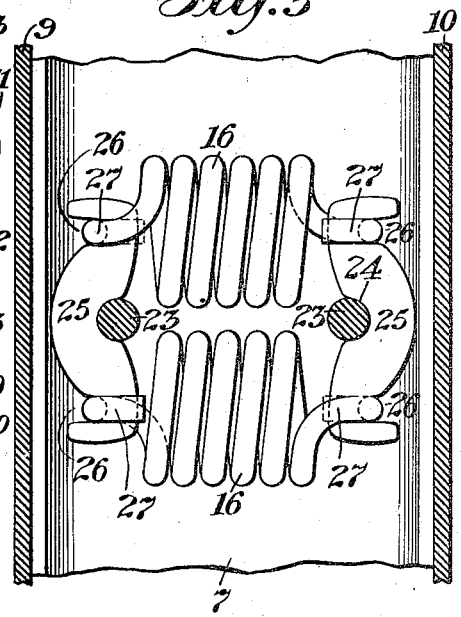

OCTAVE GINGRAS, OF LAURIERVILLE, QUEBEC, CANADA.

FLEXIBLE TIRE-RIM.

1,190,887. Specification of Letters Patent. Patented July 11, 1916.

Application filed August 28, 1915. Serial No. 47,758.

*To all whom it may concern:*

Be it known that I, OCTAVE GINGRAS, a subject of the King of England, resident of Laurierville, in the Province of Quebec, Canada, have invented certain new and useful Improvements in Flexible Tire-Rims, of which the following is a specification.

My invention relates to a flexible tire rim or resilient vehicle wheel of the class which comprises a pair of concentrically disposed members, one a wheel element designed to rotate about a fixed axis and the other a floating tread element resiliently connected under tension by means of transversely disposed coiled springs, which are inclosed by side plates fastened to one of the members and telescoping the other.

One of the primary objects of my invention is to provide a rim of the above identified type peculiarly designed to dispose the least possible amount of metal advantageously to receive and absorb the shocks which are incidental to a device of this character and, while maintaining rigidity of parts under the normal usage, at the same time, will permit a certain elasticity of parts to give under abnormal or severe shocks without rupturing or permanently distorting the device. I attain this object broadly by positioning relatively heavy castings on the members of the rim designed to withstand the strains caused by the springs attached thereto and disposing these brackets to engage the members over a relatively large area so as to distribute the strains as evenly as possible over the entire extent of the members. Further, these members are made of relatively thin gaged stock, flanged to channel shape to take advantage of the transverse strengthening effect of structures of this character. These brackets, however, are spaced from the flanges of the channel members, so that the flanges may retain their resiliency and so that they may co-act with the side plates, to form a box-rim type of mutually reinforced structure possessing some resiliency under the action of abnormal strains and particularly designed to convey transverse thrusts on the floating tread member directly to the wheel engaging portion of the inner member. These side plates are designed to add strengthening material to the flanges of the tread member and also designed to form a clencher rim for retaining demountable tread members in place.

Another object of the invention is to provide an anti-friction mounting for the springs designed so that all wearing parts may be readily replaced and so that moving parts will have relatively large bearing surfaces. I attain this object broadly by providing socketed brackets constituting a fixed part of the rim, designed to transmit tension of the springs directly to the central portion of the rim, into which sockets are demountably positioned spring supporting pins.

A still further object of my invention is to provide a light structure, with the maximum number of springs permissible in a device of this character, and with this object in view, I provide one set of brackets for each pair of springs.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

Referring to the accompanying drawings: Figure 1 is a sectional view of a fragmentary portion of a rim disclosing one set of springs illustrating a preferred embodiment of my invention and with a portion of one of the side plates broken away to show internal construction; Fig. 2 is a transverse sectional view taken on the line 2—2 of Fig. 1, looking in the direction indicated by the arrows; and Fig. 3 is a transverse sectional view taken on the line 3—3 of Fig. 2.

In the following description and in the claims, parts will be identified by specific names for convenience of expression but they are intended to be as generic in their application to similar parts as the art will permit.

In the drawings, there is shown a wheel indicated diagrammatically by a portion of the felly 4. A rim constituting an assembled unit is demountably fastened to the felly by means of circumferentially spaced radially extending bolts 5 passing centrally through the felly, but it is obvious that the portion of the rim fixedly secured to the felly may constitute an integral part of the wheel itself. In the embodiment illustrated, the rim is shown to include an outwardly facing channel-shaped inner band 6, the web 7 of which is centrally disposed across the felly with parts projecting beyond the sides of the felly to emphasize the resilient construction hereinafter described, but it is obvious that the band and felly may be of the same width. As this band does not have to withstand heavy strains it may be made of relatively light sheet metal stock flanged to shape. An outer tread 8 is spaced from the inner wheel band 6 a distance sufficient to permit the insertion of the brackets and springs hereinafter described and to permit the requisite extent of movement between the bands. The outer band is channel shape in cross-section, the channel facing the inner band and is preferably constructed of heavier stock than the inner band as it is more apt to be subjected to distorting strains. The space between the bands is closed by means of side plates 9 and 10 lapping the adjacent flanges on each side of the rim and fastened to the outer band by means of transversely disposed bolts 11 spaced circumferentially about the rim. The plate on the nut end of the bolts may be removed by unthreading the nuts thereby to permit access to the space for the purpose of repairing the parts without demounting any of the other parts. Each of the plates are crimped intermediate their width to form an inset shoulder 12 lapping the edge of its adjacent flange and engaging the same to constitute an edge brace for the same. The shoulder 12 incidentally constitutes a stop for limiting the movement of the tread member relative to the wheel member, in case a severe blow on the floating band should cause the bands to approach each other over an abnormal distance. The upper portion of each plate is inset in sliding engagement with the flanges of the inner rim, which is designed to have a snug fit therebetween. The outer portion of each of the side plates is extended beyond the web of the channel member 8, is upset to thicken the same in the direction of the flange and is rounded inwardly as shown at 13 to strengthen the end of the flange and to co-act with the web to form a clencher rim 14 to hold resilient tread blocks 15 positioned across the outer face of the web.

The bands are held in position relative to each other and under tension by a plurality of pairs of transversely disposed springs 16 spaced circumferentially about the rim. The detailed description of any one pair will suffice for any set of springs.

Each set includes two similar buttressed angle brackets 17, one affixed to the web of the inner band and the other affixed to the web of the outer band and transversely disposed relative to each other, symmetrically disposed on opposite sides of the medial plane through to the rim. These brackets are preferably heavy metal castings designed to withstand the heavy strains which might be placed thereon when the springs are severely elongated under strong shocks.

Each bracket includes a relatively broad flat base flange 18 arched in the plane of the rim so as to fit the contour thereof, as shown in Fig. 1, and fastened in place by means of a plurality of spaced apart means, herein shown to be three rivets 19 disalined so as to resist any twisting torque of the bracket upon the band. A buttress web 20 projects at right angles from the base flange toward the opposite band, is preferably triangular shape in side elevation and is disposed in a plane transversely of the rim and passing substantially through the axis of rotation thereof. This deep web acts to transfer the normal transverse strains on the brackets directly to the band and to the portion thereof adjacent its central portion. This construction is of particular advantage in relation to the relatively thin stock inner band in that strains on the bracket carried thereby are transferred directly through the web of this band to the portion thereof reinforced by the felly. The inclined inner edge of the triangular web is formed into an open end tubular member 20' constituting an elongated socket in which is rotatably mounted the shank 21 of a spring supporting pin 22. One end of the pin is offset and bent circularly to form a hook finger 23. The finger engages in a recess 24 positioned centrally in one edge of a flat yoke or bridge plate 25. The opposite edge of the bridge piece is provided with a pair of notches 26 adjacent the ends of the plate. Preferably the edges are curved toward the recess and notched so as to facilitate the mounting of the pin and spring eyes therein. The notches are each designed to contain an eye 27 formed by bending the end of each spring back upon itself in a plane perpendicular to the mandrel of the spring and, when arranged in position, parallel to and offset circumferentially from the web 20. The springs are arranged in parallelism on opposite sides of the transversely alined brackets and as close together as will permit the usual distortion of the position of the brackets without wear upon the adjacent coils of the springs.

From this construction it will be noted that the yokes 25 constitute equalizing bars for the pairs of springs in each set and provide a conveniently manipulated means for mounting the springs in position under tension.

The operation of the rim in general, resembles that of resilient wheel devices which depend upon the action of transversely disposed springs for holding a floating tread member. By means of a device of this character, however, the strains on the springs are transferred directly to the central portions of the rim, leaving the side flanges free to form a light box type of rim with a rigidity sufficient to maintain its form intact under normal working condition, but having a resiliency in the several parts sufficient to absorb thrusts thereon by a spring of the metal, thus, in effect, supplementing the action of the springs. This construction permits the use of relatively light springs, which may merely be sufficient to withstand the normal vibratory movements incidental to vehicle wheels, relying upon the structure of the frame to absorb abnormal shocks. On the other hand the spring supports may be rigid castings and may be made as heavy as desired or necessary. Spacing these castings from the flanges permits the flanges to retain their natural resiliency without interference from these heavy members. In other words, the rim is strong through its medial plane and this is where the greatest strength is needed.

The pull on the ends of the pins, of course, tends to rotate these pins about an axis transversely thereof, but this rotation is resisted by the full depth of material in the projecting web of the base and this web in turn acquires all of the strength secured by the broad anchored base. As these pins are pivotally mounted they are free to swing with the springs in their several disalining positions, thus tending to reduce the friction of moving parts between the springs and their holding element. The shank portion of each pin is mounted in the relatively long socket thus tending to distribute bearing strains over a relatively large area.

The equalizing plate is free to swing about the movable pins thus providing an easily moved connection between the springs and the rim which connection is free from the usual initial resistance to the movement of the floating tread band.

Wear of the parts is practically confined to the pin and equalizing plate, but as both of these parts are inexpensive, worn parts of the device may be replaced at low cost. Relatively short length springs are used but the entire spring is utilized, even the end eye portions contributing their resiliency to the effectiveness of the springs.

While I have shown and described and have pointed out in the annexed claims, certain novel features of my invention, it will be understood that various omissions, substitutions and changes in the form and details of the device illustrated and in its operation may be made by those skilled in the art without departing from the spirit of the invention.

Having thus described my invention, I claim:

1. In a device of the class described, the combination of an inner wheel band designed to be attached to the wheel, an outer tread band encircling the inner band, an angle bracket having a broad flat base flange, a plurality of spaced apart fastening means for affixing said base to one of said bands thereby to resist twisting of the same, a post projecting from said base flange toward the other band and cushioning means for holding the bands in operative relationship, said means including a transversely disposed spring having one end pivotally supported from said post and the other end pivotally supported from the other band.

2. In a device of the class described, the combination of an inner wheel band designed to be attached to the wheel, an outer tread band encircling the inner band, fastening means for affixing said bracket to one of said bands, a post projecting from said base flange toward the other band and cushioning means for holding the bands in operative relationship, said means including transversely disposed springs having one end of each pivotally supported from said post and the other ends pivotally supported from the other band, the ends of said spring being bent back upon themselves to form end eyes disposed in transverse planes passing substantially through the axis of rotation of the tire.

3. In a device of the class described, the combination of an inner wheel band designed to be attached to the wheel, an outer tread band channel shape in cross-section, a rigid bracket fixed to said inner band, a second rigid bracket fixed to the web of said channel shape tread band and spaced from the flanges thereof whereby the flanges of said tread member are permitted some resiliency relative to the web thereof, cushioning means for holding the bands in operative relationship, said means including transversely disposed spring connections disposed between said rigid brackets.

4. In a device of the class described, the combination of an inner wheel band, channel shape in cross-section, means for attaching the web of said band centrally to the felly of a wheel, an angle bracket having a base portion extending transversely of the web of the band and on the side thereof opposite the side engaged by the wheel felly whereby strains on said bracket are transferred directly to the portion of the band reinforced by the felly, cushioning means for holding the bands in operative relationship, said means including a transversely extending spring placing a strain on said bracket and side plates having a sliding engagement with the flanges of said channel shape band and capable of acting thereon to distort the same slightly.

5. A tire for vehicle wheels including an inner wheel band adapted to be attached to the wheel, an outer element encircling the inner member and including a channel shaped member with the channel facing the inner band, a side plate engaging the outside of one of the flanges of the channel members and extending to the band, said side plate having an offset portion lapping the edge of said flange and having an inturned outer end portion projecting beyond said flange and coacting with the web of said member to form a clencher rim for a resilient tread section carried by the member, said offset portion of the side plate constituting a stop for limiting the movement of the outer element toward the wheel band and resilient means for maintaining said element and band in position.

6. A tire for wheels including an inner wheel member and an outer tread member encircling the same, a pin mounted on one of said members for movement about a fixed axis of rotation and having a spring construction engaging portion extending diametrically of the tire and projecting toward the other of said members and cushioning means for holding the bands in operative relationship, said means including a transversely disposed spring construction having one end pivotally attached to said portion of the pin and the other end attached to said other member, said portion being free to revolve under the action of said spring.

7. A tire for wheels including an inner member and an outer tread member encircling the same, cushioning means for holding the bands in operative relationship, said means including a socketed bracket fixed to one of said members, a pin rotatably mounted in the socket and projecting toward the other member, a transversely disposed spring having one end supported from said pin and the other end supported from the other member, said pin being readily demountable from said socket whereby the same may be quickly replaced when worn.

8. A tire for wheels including an inner member and an outer tread member encircling the same, cushioning means for holding the bands in operative relationship, said means including a bracket fixed to each of said members, a pin rotatably mounted in each bracket, said pins extending parallel to each other and inclined to the plane of the rim and a transversely disposed spring operatively connected to said pins.

9. A tire for wheels including an inner member and an outer tread member encircling the same, cushioning means for holding the bands in operative relationship, said means including a bracket fixed to each of said members, a pin rotatably mounted in each bracket, said pins extending parallel to each other and inclined to the plane of the tire, a bridge plate pivoted to each of said pins, and a transversely disposed spring connecting said bridge plates.

10. A tire for wheels including an inner member and an outer tread member encircling the same, cushioning means for holding the bands in operative relationship, said means including a bracket fixed to each of said members, a pin rotatably mounted in each bracket, said pins extending parallel to each other and inclined to the plane of the rim, a bridge plate pivoted to each of said pins, and a pair of parallel springs connecting said bridge plates on opposite sides of the pins.

11. A tire for wheels including an inner member and an outer tread member encircling the same, a plurality of pairs of brackets, each pair spaced apart circumferentially of the tire, a bracket of one pair attached to the inner member and the other bracket attached to the outer member, pairs of transverse springs arranged parallel to each other in a circle about the tire, each pair connecting a pair of said brackets.

12. In a device of the class described, a tire including an inner and an outer rim and means for holding the same in cushioning relation to each other, said means including a plurality of pairs of horizontally disposed springs, disposed parallel to each other, with adjacent ends of each pair of springs pivotally connected to each other.

13. In a device of the class described, a rim holding means including a pair of spaced apart bridge plates, a pair of parallel springs disposed between said bridge plates and fastened thereto, and means for pivotally supporting each of said plates between the points of attachment of the springs therewith.

14. In a device of the class described, a rim holding means including a pair of spaced apart bridge plates, a pair of parallel springs disposed between said bridge plates and fastened thereto, a support adjacent each of said plates, a pin pivotally mounted in each of said supports with each pin engaging one of the bridge plates between the points of attachment of the springs.

15. In a device of the class described, rim holding means including a pair of springs disposed side by side and means associated with the springs for equalizing the tension of the same.

Signed at New York city, in the county of New York and State of New York, this 20" day of August, 1915.

OCTAVE GINGRAS.

Copies of this patent may be obtained for five cents each, by addressing the "Commissioner of Patents, Washington, D. C."